United States Patent Office.

PETER MAYS AND PRICE MAYS, OF CLEARFIELD, PENNSYLVANIA.

Letters Patent No. 98,875, dated January 18, 1870.

IMPROVED MEDICAL COMPOUND.

The Schedule referred to in these Letters Patent and making part of the same.

*To all whom it may concern:*

Be it known that we, PETER MAYS and PRICE MAYS, of Clearfield, in the county of Clearfield, and State of Pennsylvania, have invented a new and valuable Medical Compound; and we do hereby declare that the following is a full, clear, and exact description of the same.

Our invention relates to remedies designed to alleviate the sufferings and diseases incident to the human body.

To enable others skilled in the art to make and use our invention, we will proceed to describe the same, and our method of compounding our said remedy.

For the purpose of preparing eight fluidounces of our compound, we take three-fourths of an ounce of pulverized horse-radish, three ounces extract of ground ivy, one-fourth of an ounce of red beet, bruised, and add to the whole four ounces of apple-cider, adding a small proportion of alcohol, if necessary, to preserve a long time. A suitable time is to be allowed for maceration, when it is ready for use.

This compound is designed to be used for the alleviation and cure of asthma, coughs, and colds, and may be administered in doses from a half teaspoonful to one tablespoonful, according to the age of the patient, and peculiarities of temperament, from two to four times a day, lessening the quantity and frequency of the dose as convalescence proceeds.

What we claim as our invention, and desire to secure by Letters Patent, is—

The medical compound herein described, compounded of the ingredients and in the manner substantially as specified.

In testimony that we claim the above, we have hereunto subscribed our names, in the presence of two witnesses.

PETER MAYS.
PRICE MAYS.

Witnesses:
ISRAEL FEST,
WM. D. BIGLER.